United States Patent [19]

Lerner

[11] Patent Number: 4,795,619
[45] Date of Patent: Jan. 3, 1989

[54] REMOVAL OF ACID GASES IN DRY SCRUBBING OF HOT GASES

[76] Inventor: Bernard J. Lerner, 727 Orchard Hill Dr., Pittsburgh, Pa. 15238

[21] Appl. No.: 28,572

[22] Filed: Mar. 20, 1987

[51] Int. Cl.$^4$ .................. C01B 17/56; C01B 17/36; C01B 17/90; C01B 17/027
[52] U.S. Cl. .................................. 423/244; 423/240
[58] Field of Search .................. 423/244 A, 240 S

[56] References Cited

U.S. PATENT DOCUMENTS

| | | | |
|---|---|---|---|
| 3,976,747 | 8/1976 | Shale et al. | 423/551 |
| 4,454,102 | 6/1984 | Lindau et al. | 423/244 A |
| 4,604,269 | 8/1986 | Yoon | 423/244 A |
| 4,613,487 | 9/1986 | Yoon et al. | 423/244 A |

FOREIGN PATENT DOCUMENTS 0139352 2/1985 European Pat. Off. ......... 423/244 A

OTHER PUBLICATIONS

Hampel, Clifford A., "The Encyclopedia of Chemistry", 3rd Ed., Van Nostrand Reinhold Comp.
Grant, Julius, "Hackh's Chemical Dictionary", 4th Ed., McGraw-Hill Book Company, pp. 708-709.

Primary Examiner—Robert L. Stoll
Assistant Examiner—Adriana L. Mui
Attorney, Agent, or Firm—Olin E. Williams

[57] ABSTRACT

A method and apparatus for removing acid gases such as halogen acids and sulfur oxides from a hot flue gas by contacting the gas with a finely-divided, pre-moistened and partially-agglomerated, intimate mixture of a solid alkaline reagent and a deliquescent compound. The dry akaline reactang/deliquescent compound mix is pre-conditioned by exposure to a gas of controlled humidity for a time sufficient to cause partial liquefaction of the deliquescent compound. Contact at controlled humidity conditions may be effected in a treating vessel or in a transport duct prior to injection into the hot flue gas. Alternatively, the dispersed deliquescent compound may be separately liquefied prior to mixing with the alkaline solids. Liquefaction of the deliquescent compound is achieved by controlling the partial pressure of water vapor in the conditioning gas mixture at a level higher than the equilibrium vapor pressure of the liquefied deliquescent material or its highest hydrate. In these moistening methods, the ratio of deliquescent to alkaline solids feed rates is so adjusted as to avoid the buildup of wetted material on the duct walls.

9 Claims, 1 Drawing Sheet

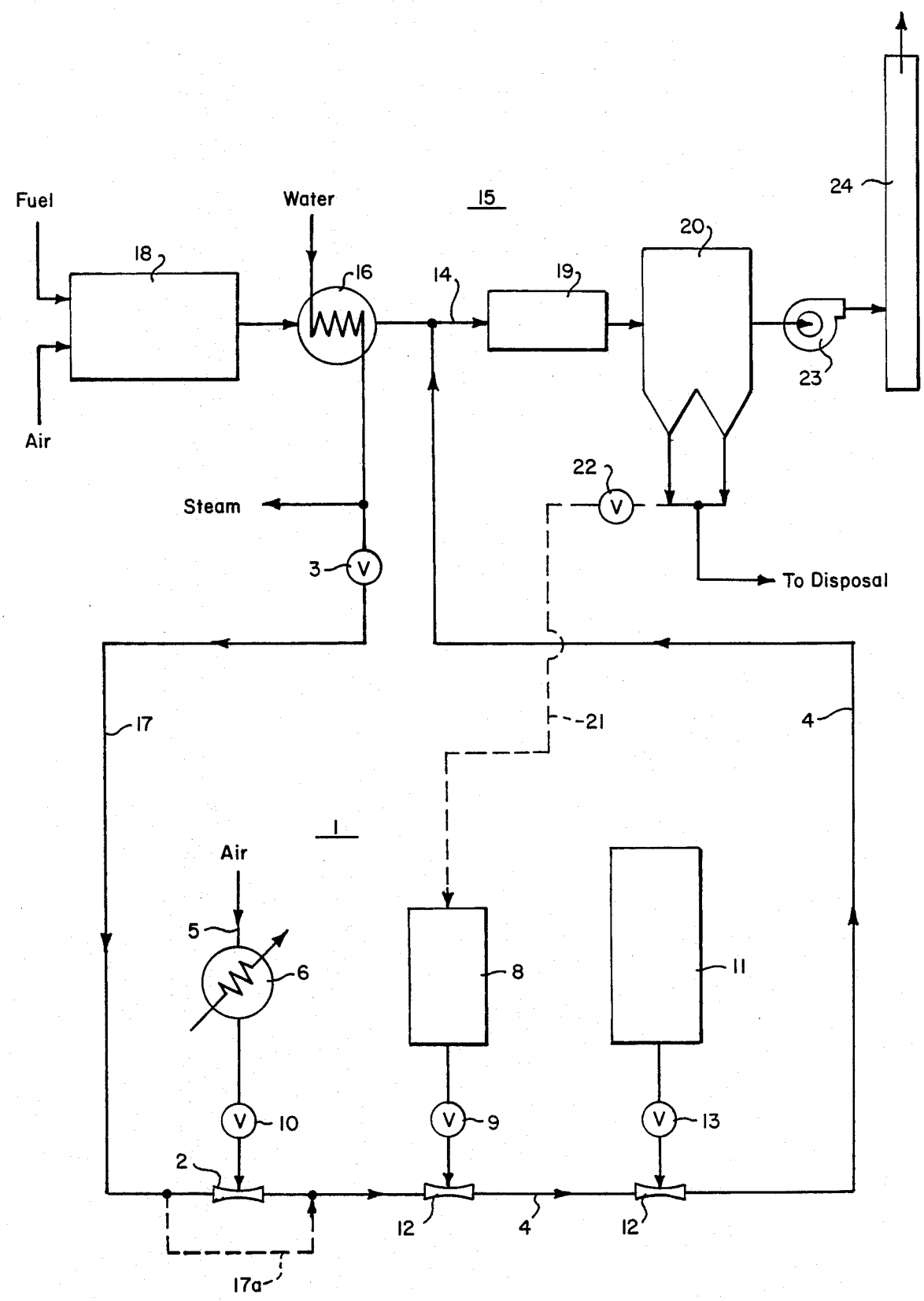

REMOVAL OF ACID GASES IN DRY SCRUBBING OF HOT GASES

FIELD OF THE INVENTION

The present invention relates to a method and apparatus for the removal of acid gases from hot combustion gases using "dry" solids contacting. It particularly relates to a method and apparatus wherein the combustion gases, containing acid gases such as halogen acids or sulfur oxides, are contacted with a premoistened mixture of an alkaline compound, such as hydrated lime, and a partially or completely liquefied deliquescent compound. The finely-divided solids mixture is premoistened prior to injection into the hot flue gas by exposure to conveying and/or treating gas of controlled humidity for a time sufficient to cause at least partial liquefaction of the deliquescent compound. The injection of the moistened mixed solids may be effected without significant cooling of the flue gas, and humidification of the total flue gas is not required to obtain the reactivity benefits of moist alkaline solids.

BACKGROUND OF THE INVENTION

In many types of combustion operations, acid gases are formed and these must be reduced to non-harmful or regulated levels prior to emission of the combustion gases to the atmosphere. Such acid gases include the sulfur oxides and the halogen acids such as hydrochloric, hydrofluoric, hydrobromic and hydroiodic acid. The acid gases are generated in the combustion of coal and fuel oil and in the incineration of municipal garbage, hazardous wastes and/or other wastes which may typically contain halogenated compounds in the form of solvents, scrap plastics, and the like.

There are three major types of prior art methods for the removal of acid gas components from flue gases: wet scrubbing, spray-drying (so-called "wet-dry" scrubbing) and dry solids contacting. Both wet scrubbing and spray-drying processes suffer from major corrosion, plugging and scaling problems associated with the presence of an aqueous solution phase. There is some confusion in existing terminology resulting from the fact that some proponents of spray-drying technology have wishfully labeled spray-drying operations as "dry" processes; as used herein, spray-drying is considered to be a wet-dry process. Economically, true dry solids processes require much lower capital investments than either wet scrubbing or spray-drying processes. However, although dry solids contacting methods avoid the problems of the wet methods, the acid gas removal efficiency obtained in these processes is generally lower than in wet processes because of slower gas-solid reaction kinetics. Methods for improving the reaction kinetics of true dry solids processes are required to make these processes technically and commercially feasible for the removal of acid gases.

It is known in the art to employ hygroscopic or deliquescent additives in conjunction with flue gas humidification/cooling for both dry and wet-dry (spray-drying) $SO_2$ removal processes in order to improve acid-removal efficiency. Karlsson, et al, in the Journal of the Air Pollution Control Association, pp.23–28, Vol.33, No. 1, January, 1983, theorize that the characteristic of such materials in spray drying operations is to retain liquid beyond the normal drying times and prolong the period during which ionic reactions, i.e., neutralization of absorbed acid gases with dissolved alkaline reactant in solution, can occur. Karlsson explored a large number of compounds as reaction enhancement additives in the wet-dry scrubbing of $SO_2$. It was found that the most effective compounds were deliquescent at the conditions employed, 70° C. and 61% relative humidity, which are not conditions that prevail in flue gas. In order to achieve the conditions necessary for liquid retention by these deliquescent compounds, the flue gas must be both cooled and humidified, a process that has serious side-effects.

Similarly, Lindau and Ahman, in U.S. Pat. No. 4,454,102, claim the use of hygroscopic materials to form a liquid phase partially covering the surface of the alkaline solids collected on a baghouse filter in a spray-drying process for acid gas removal from flue gas. Lindau and Ahman typically operate the baghouse filter at temperatures of 70° C., which flue gas temperature level must be achieved by evaporative cooling, a process with severe potential problems in an acid-gas containing flue gas. Further, the compounds of Lindau and Ahman are hygroscopic compounds, not deliquescent ones.

Additional prior art that calls for cooling and conditioning the hot flue gas to increase the degree of water vapor saturation include Shale and Cross in U.S. Pat. No. 3,976,747, for a dry process, and Felsvang, et al, in U.S. Pat. No. 4,279,873, for a spray-drying process. This and other prior art call for evaporative cooling by water sprays to achieve a close approach to gas saturation. Cooling of the gas to near-saturation temperatures has a number of distinct disadvantages which render this mode of operation unattractive in a continuous industrial operating situation. P. S. Farber, in an article, "Emissions Control Through Dry Scrubbing", *Environmental Progress*, Vol. 5, No. 3, pp. 178–183, August, 1968, discusses the use of spray drying methods of $SO_2$ removal from flue gases. Farber states that it is desirable to maintain the combustion gas as close to its dewpoint as possible to facilitate the time and rate of transfer of the acid gases to the available alkali. However, to avoid forming mud on the bag filters or on the plates of the downstream ESP, or the severe corrosive effects of condensation in an acid gas system, the approach is "normally controlled at no less than 19° F. above the dewpoint". Such exact control is not only difficult to maintain, but cooling the gas to temperatures approaching the dewpoint has additional consequences other than the undesirable and serious problems indicated by Farber. Cooling of the gas causes loss of plume buoyancy with the resulting possibility of forming local ground fog, reduced visibility and associated hazards. Restoration of plume buoyancy requires reheating the flue gases and the wasteful use of heat energy.

Additionally, cooling of a gas containing such acid components as HCl, $SO_2$ and/or $SO_3$ close to its dewpoint gives rise to severe corrosive conditions. If there are even minor concentrations of HCl or $SO_3$ present, the dewpoint will be dramatically elevated. For example, a gas with a 1000 ppmv content of HCl gas with a water wet bulb temperature of 140° F. (dewpoint of about 120° F.) will have an acid dewpoint of 148° F., with a liquid-phase HCl concentration of 14% by weight. For $SO_2/SO_3$ the situation is much worse because of the higher boiling points of sulfuric acid. A flue gas with a water concentration of 12% has a dewpoint of approximately 120° F. in the absence of $SO_3$. The addition of only 1 ppm $SO_3$ raises the dewpoint to 230° F. In the latter case, it is not necessary to cool to the water dewpoint to generate acid formation and corrosive attack. The presence of small amounts of $SO_3$ is virtually inescapable when burning a high-sulfur fuel or a variable waste material that contains sulfur or $H_2SO_4$. To avoid corrosion problems and the possible loss of the downstream equipment, it is necessary to keep the gas hot and well above the acid dewpoint. For a gas containing traces of $SO_3$, cooling to a controlled approach to the much lower water wet bulb temperature, as taught by the prior art, can result in catastrophic corrosion failure.

Yoon, in U.S. Pat. No. 4,604,269, removes sulfur oxides from flue gas by first cooling the flue gas to "a relatively low temperature", contacting with a finely divided dry sorbent which has been treated with a solubilizing solution, and then humidifying the flue gas with a water spray or steam injection. Yoon conveys the treated solids to the flue gas injection point using air or superheated steam. Superheated steam is by definition at temperatures above the boiling point of water at its specific pressure, and such steam is "dry" and cannot effect deliquescence. Yoon therefore effects the liquefaction of his "solubilizing compounds" after injection into the flue gas by humidifying the flue gas with water sprays or steam. Again, water spraying is the equivalent of the wet-dry spray drying-operation, with all of the disadvantages of wet processes, and injection of steam into bulk flue gas for purposes of humidification is highly uneconomic because of the large quantities of steam required to humidify the relatively very large total flue gas flows.

SUMMARY OF THE INVENTION

It is the object of this invention to provide a substantially dry scrubbing process for acid gas removal from hot flue gases which has the enhanced chemical reactivity characteristic of near-saturation humidified flue gas scrubbing, but in which this activity is obtained without significant humidification or cooling of the flue gas. It is also an object of this invention to avoid the corrosion and other problems associated with flue gas humidification-cooling and dewpoint approach. It is a further object of this invention to obtain the activation of dry reactants for acid gas reaction by moistening the alkaline reactant under totally controlled conditions external to the flue gas prior to injection into the flue gas.

In the method of this invention for the removal of acid gases from hot flue gases, a particulate alkaline reagent is activated by dispersion in humid gas having a relative vapor tension higher (or, otherwise expressed, a partial pressure of water vapor higher) than the fugacity of water in an adsorbed layer on the reactant. The alkaline reactant may also be activated by moistening a mixture of the finely-divided solid alkaline reagent and a deliquescent compound by exposure to a humid gas prior to injection into the hot flue gas. The term "finely divided" as used herein means that readily determinable degree of sub-division which permits the reagents to be effectively dispersed in a gas stream, is to be found in chemical engineering texts, and is usually from about 0.1 to 1.0 mm in diameter. The time of exposure of the mixture to the controlled-humidity contacting gas is such as to effect partial liquefaction of the deliquescent compound and its agglomeration with the alkaline solids prior to injection into the flue gas. Contact at controlled humidity conditions may be effected in a treating vessel or, preferably, in the transport duct conveying the solids to their injection point into the hot flue gas. Alternatively, the dispersed deliquescent compound may be separately liquefied by humid gas exposure prior to mixing with the alkaline solids. Liquefaction of the deliquescent compound, whether separately or in admixture with the alkaline solids, is achieved by exposure to a gas having more than the "minimum critical moisture content", $H_c$. This latter value is defined as the humidity at which the partial pressure of water vapor in the gas equals the equilibrium vapor pressure of the liquefied deliquescent material at the conditioning gas temperature. In one embodiment of the invention, a mixture of the finely-divided alkaline reagent and the deliquescent compound is fed to a treating vessel, and a gas having a humidity higher than $H_c$ is used to fluidize the solids while simultaneously effecting at least partial liquefaction of the deliquescent material. The conditioned mixture is then withdrawn from the vessel and injected into the flue gas. Although this treatment may be accomplished on a batch basis, it is preferable to operate the humidification/liquefaction process continuously, with continuous solids feed to, and withdrawal from, the fluidized bed.

In the preferred embodiment of this invention, the alkaline reagent/deliquescent solids mix is conditioned by exposure in a pneumatic conveying duct to gas of humidity greater than $H_c$, which gas also constitutes the transport medium conducting the solids from their storage silos to the flue gas injection point. The deliquescent compound may be liquefied prior to contact with the alkaline solids by separate humid gas treatment, or by separate introduction into the conveying duct upstream of the point of introduction of the alkaline solids. Following introduction of the activated solids into the flue gas stream and effective interaction of the acid gases thereof with the activated solids, the reaction products are subsequently collected from the flue gas stream by means of a downstream fly ash collector, such as a baghouse fabric filter or electrostatic precipitator.

The alkaline reactant is selected from the group consisting of the alkali metal and alkaline earth carbonates, bicarbonates, hydroxides, oxides and mixtures thereof. The preferred reactant is hydrated calcium hydroxide, although where economically justified, sodium carbonate or bicarbonate may be used as the alkaline reactant.

Deliquescent compounds that can be employed in the method of invention include those compounds known to the prior art such as those described in Lindau et al in U.S. Pat. No. 4,454,102 or by Karlsson (loc. cit.). In addition, those compounds that are generally considered not to be deliquescent because their hydrates have relatively high water vapor pressures and do not undergo deliquescence or liquefaction under ambient air conditions may also be employed. Such compounds include the hydrates of sodium carbonate and bicarbonate, calcium sulfate, magnesium sulfate, magnesium carbonate, magnesium sulfate and sodium sulfate and may be selected on the basis of economic availability and freedom from corrosive effects in the employed system. The hydrate compounds having relatively high vapor tensions are particularly well adapted to the treating of alkaline reactant in a conveying duct or dense fluid column prior to injection into the flue gas. These compounds will not liquefy as quickly as low vapor tension deliquescent compounds and thus will distribute their aqueous condensate more uniformly over the surface of the reactant in the conveying stream or treating chamber, and, conversely will not tend to agglomerate into large drops before they have become coated with finely divided alkaline reactant.

The critical minimum water vapor partial pressure in the conveying gas required for liquefaction of the deliquescent solids may be achieved by any of the conventional means of humidification of the air used for pneumatic air transport. Such humidification can, for example, be obtained by injecting steam into the air stream or by using steam as the primary conveying fluid, with air dilution used to control the humidity levels above the value, $H_c$.

The deliquescent material may be taken at least in part from only partially-reacted solids separated from the treated gas stream in the baghouse or by an electrostatic precipitator, or other solids separating means.

BRIEF DESCRIPTION OF DRAWING

The single FIGURE is a schematic flow diagram showing the dry solid moistening process operated in an embodiment of this invention.

DESCRIPTION OF THE DRAWING

In the humid gas solids transport system 1, steam is admitted to the venturi 2 and insulated line 17 through a throttling valve 3. If steam conveying alone is desired, then the venturi may be omitted or bypassed through line 17A. If a steam-air mixture is desired, then valve 10 is open and the steam venturi aspirates air through line 5. By initially passing the pressurized steam through the venturi 2 and ingesting sidestream air through the venturi vacuum created, a controlled steam-air ratio is generated in the conveying duct, having a moisture content greater than $H_c$. Appropriate variation of the air bleed and steam flow valves provides a conveying stream having controllable steam/air temperature and water partial pressure. Line 5 may contain an optional heat exchanger 6. The need for the air heater depends on the quality of the motive steam; it is desired to avoid condensation in line 4 and the steam-air mixture must be maintained above the mixture dewpoint temperature. The partial pressure of water vapor in line 4 is controlled at the desired level by appropriate adjustment of valves 3 and 10.

Particles of deliquescent material such as sodium carbonate are fed from silo 8 through a feeder device 9 at a controlled rate of flow to line 4 in which it is exposed to the plus-$H_c$ conveying gas and begins to deliquesce. The dry alkaline reactant, such as hydrated lime, is fed from silo 11 through a feeder device 13. To prevent backflow of the steam-air mixture through the solids feed devices, the solids pickup points of line 4 may be venturis 12. The solids mixture is conveyed by the humid gas to the point of injection into the flue gas stream. The residence time of the mix in the humid gas transport duct prior to injection into the flue gas should be long enough to substantially complete the liquefaction of the deliquescent compound. The degree of liquefaction of the deliquescent compound achieved in the transport duct is controlled not only by the residence time in the duct but also by nature of the compound and the differential between the relative humidity of the transport gas and the vapor tension of the compound. Transport duct residence times will be in the range of 1 to 8 seconds, and preferably 2 to 6 seconds.

In the transport duct, the deliquescent material liquefies, and these wet particles agglomerate with, and either coat, or are coated by, the dry lime particles. A coating action is desirable because it prevents wetted particles from impacting on the interior surfaces of the conveyance duct and building up deposits. Coating also provides the necessary close association of the wet deliquescent material with the lime reactant and moistens the lime. This coating action may be enhanced by the proper adjustment of the ratio of the deliquescent/lime materials and their respective particle sizes and by injection of deliquescent material upstream of the alkaline solids. The weight ratio range of deliquescent compound:alkaline reagent used in the method of this invention is 1:50 to 1:5, with the preferred range of 1:30 to 1:10.

To avoid coating the walls of the conveying duct with wet solids, the inside walls of the duct should be smooth and free from defects that would cause solids accumulations. Further, conveying duct elbows and bends should be minimally longsweep bends in accordance with good design practice for pneumatic conveyance ductwork.

In the flue gas system 15, steam is taken from the primary or waste heat boiler 16 downstream of the furnace 18 through line 17 for the humidification/deliquescence system 1. Following introduction of the moistened solids mix to the flue gas flowing in line 14 from waste heat boiler 16, a turbulence promoter 19 comprising a gas-solid mixing device such as a baffle may be optionally employed to secure good distribution of the solids in the flue gas stream. From the distributor, the flue gas flows to the solids collector device 20 which is preferably a baghouse fabric filter collector. A por tion of the collected fly ash and partially-spent solids may be recycled to the deliquescent material silo through line 21 under control of diverter valve 22. Cleaned gases are exhausted by means of an exhaust blower 23 through stack 24.

Although conventional air humidification means may be used to generate the conveying gas, it is more convenient to use steam as the primary medium. Steam will usually be available in typical combustion or incineration installations from the waste heat boilers. The amount of steam required for the pneumatic transport of solids is in the range of 400 to 700 lbs./hr., which is a negligible fraction of the total amount of steam normally generated in these associated boilers.

The method of this invention affords direct control of the deliquescence effect and the use of a wider range of materials for this purpose than has been previously allowed by the prior art. The ratio of the vapor pressure of a salt solution or mixture of anhydrous salt and hydrates to the vapor pressure of water at the same temperature is known as the relative solution vapor tension or relative vapor pressure. Deliquescence occurs when the relative vapor tension of the gas (or fractional relative humidity) is greater than the vapor tension of the solution or hydrate mixture.

For most solid fuel combustion gases, the wet bulb temperature is of the order of 140° F. (60° C.). Adiabatically cooling a gas of this wet bulb temperature with a water spray to 190° F., would give a fractional relative humidity of 0.31 (149.8/484.5), taken from Table I. If a deliquescent compound such as ammonium nitrate, whose solution relative vapor tension is 0.4 at 190° F. is introduced into the hot flue gas, then deliquescence will not occur at these conditions. For these gas conditions, a salt-hydrate system having a relative vapor tension less than 0.31 must be used at 190° F. The number of such low vapor tension systems is limited, and qualifying reagents, such as KOH, are either too expensive for economic use or, in the case of a low-cost compound such as $CaCl_2$, too corrosive and unstable. The steam or adjusted steam-air atmosphere of the conveying fluid of this invention, however, allows the use of high vapor tension systems such as sodium carbonate or bicarbonate, sodium chloride, etc., which typically have deliquescent vapor tensions of 0.7 or higher, and which cannot be employed in processes of the prior art. This is particularly the case if it is desired to avoid excessive cooling of the flue gas. The relative humidity of a combustion flue gas cooled to a typical temperature of 400° F. following a waste heat boiler, is of the order of 1% to 3% or less, which is much too dry to permit the use of any known hygroscopic or deliquescent compound.

TABLE I

Saturation Humidities as Function of Temperature
(Perry's Chemical Engineers' Handbook, 4th Edition)

| Temperature °F. | Saturation Humidity lb./lb. dry air | Mole Percent Water | mm Hg Water Saturation Pressure |
|---|---|---|---|
| 80 | 0.00223 | 0.3555 | 2.7 |
| 120 | 0.08149 | 11.5345 | 87.7 |
| 140 | 0.1534 | 19.707 | 149.8 |
| 160 | 0.2990 | 32.359 | 245.9 |
| 190 | 1.099 | 63.747 | 484.5 |
| 200 | 2.295 | 78.596 | 597.3 |

EXAMPLE 1

In a garbage incineration plant, municipal waste is classified and the combustible wastes are incinerated. The incinerator is a rotary kiln incinerator, and following startup with natural gas, the combustion of the wastes is self-supporting. The hot exhaust gases from the incinerator are passed through a waste heat boiler to produce steam. Two parallel combustor/-boiler trains are operated, each having a solids waste throughput of 255 tons/day. The solids have a heating value of 4500 Btu/lb. Each boiler produces 59,400 lb./hr. of steam at 600 psig and 700° F., and a lesser amount of steam at 20 psig and 228° F. The flue gas rate exiting each boiler is 40,700 ACFM at a temperature of 400° F., and the gas contains 118 lb./hr. HCl and 46 lb./hr. of $SO_2$, as well as 1481 lb./hr. of particulates. Emission regulations require the flue gas to be treated to remove 80% of the HCl and to have a final particulate concentration of less than 0.05 gr./SCF, when corrected to 7% oxygen. The adiabatic saturation temperature of the flue gas is 140° F.

Hydrated lime and sodium carbonate, each with a particle size less than 200 mesh, are stored in bulk form in silos (one for each material) having a capacity of 35 tons of material, or about 1-½ truck loads. The solids are discharged from the storage silo using a bin activator to insure material flow into two separate solids feed systems. Each solids metering feed system is comprised of separate line volumetric screw feeders, which discharge through a rotary airlock into each of the parallel humid gas conveying lines which serve to transport and premoisten the solids. The feed rate of hydrated lime to each line is 200 lb./hr. with sodium carbonate injected at 10% of the lime rate, or 20 lb./hr.

A single steam venturi injector is used to serve both conveying lines, with another injector serving as a standby spare. The conveying medium is a steam-air mixture adjusted to contain 75 mole percent water vapor at a temperature of 197° F. as follows: The desired mixture humidity is obtained by throttling 500 lb./hr. of 20 psig saturated steam through a jet venturi ejector to a pressure of about 1 psig and a temperature of 227° F. The ejector provides the motive force necessary to convey the solids and induces ambient air through a side duct in the venturi throat at a rate controlled by throttling to 500 lb./hr. This air is preheated by the heat exchanger to a temperature of 140° F. The resultant mixture has a humidity of about 0.5 lb./lb. dry air, a water partial pressure of 470 mm. Hg, and a temperature of 197° F. The dew point of the mixture is approximately 173° F., giving a 24° permissible temperature drop before condensation will occur. This safety margin can be increased by pre-heating the air to a higher temperature than 140° F. The ejector and conveying line are insulated so that the gas is maintained well above the dew point.

In the conveying line, the sodium carbonate is introduced first, upstream of the hydrated lime, and the combined material is injected into the flue gas ductwork upstream of the baghouse. The moistened dispersed phase solid is injected through a baffle mixer to insure complete mixing of the material with the flue gas prior to entry into the baghouse. The reacted materials and particulates are removed in a pulse-jet baghouse, and the clean flue gas is then exhausted by induced draft fans to the stack.

Without specifically restricting the phenomena producing the improved results of the method of invention, especially in respect of costs of operation and avoidance of corrosion of flue gas ducts, it is understood that the method employs a combination of deliquescence, adsorption and chemisorption to retain moisture in the alkaline reactant. All of these forces in combination overcome to a practical operating extent the vaporization capacity of the high temperature flue gas for a long enough period to effect the removal of noxious and corrosive pollutants, primarily the halogen acid gases and sulfur oxides, from the flue gas. Methods which require cooling and condensing water from flue gases are obviously too costly for general use and engender other above-mentioned disadvantages. Bringing the alkaline reagent into contact with humid air outside of, or prior to, contact with the flue gas causes moisture to be adsorbed on the surface of the alkaline reagent and this phenomenon is greatly enhanced by the solution depositing effect of the employed deliquescent compound. At the same time, the use of a deliquescent compound is made practicable by the presence of larger quantities of dry particulate alkaline reagent, which prevents the agglomeration and deposition of moist deliquescent compound on apparatus, lines and containers, until the so-treated reagent is completely prepared. The reagent is thus so conditioned that the forces of adsorption serve to retard evaporation of the liquid water serving as the dissolution medium for the acid gases when injected into the high temperature flue gas. Evaporation retardation is further provided by the lowering of the solution fugacity caused by the presence in adsorbed water of dissolved alkaline rea9ent. These effects promote rapid reaction with the acid gases before removal of the moisture from the reagent.

The means whereby the method of invention can be accomplished requires that each of the above-described procedures be accomplished on a continuous basis under substantially automatic control because the requirement for removal of acid gases from flue gas and the like produced, for example, in fossil-fuel fired power plants is linked to the operation of the plant and the production of power, which is required to be unceasing. Such means are therefore within the scope of the invention and consist in provision for economical and continuous supply of conveying steam; apparatus for conveying the steam and continuously aspirating air in a controlled proportionate volume into the steam; venturi or mechanical feeder means in the line supplying the steam-air admixture for withdrawing particulate deliquescent compound from storage means and injecting the compound into steam-air supply line; similar means for continuously injecting particulate alkaline reagent into the steam-air admixture; means for bringing the reagent and conditioning agents into effective contact being preferably a conveying line bringing the treated agent from a continuous source of supply into contact with a flue gas to be treated and comprising alternatively means for containing a dense fluid bed of the reagent and the conditioning agent and passage therethrough of humid air, and means for bringing treated alkaline reagent into continuously flowing contact with the stream of flue gas including preferably baffling or like structures in the flue gas line; and means for separating spent alkaline reagent and other particulate solids from flue gas. The flue gas from which acid gases have been removed is vented to the atmosphere through conventional stack means.

The aforementioned means for separating particulate solids continuously from the flue gas is conventionally a baghouse, which is adapted to continuous removal of particulate and partially spent reagent and permits the recycle therefrom to an inflowing stream of additional moist air.

What is claimed is:

1. A method for the removal of acid gases from waste gas comprising: dispersing a particulate alkaline reactant in a humid inert gas and retaining the reactant in contact with the inert gas for a time sufficient to adsorb on the reactant at least a monomolecular layer of water, the said inert gas having a partial pressure of water vapor higher than the fugacity of a minimum layer of water thereby adsorbed on the reactant; conveying the so-treated dispersed reactant in a stream of the humid gas into contact with substantially the entire flow of waste gas thereby effecting absorption of the acid gases from the waste gas and reaction of the acid gases with the so-treated alkaline reactant; and separating so-reacted alkaline reactant from so-treated waste gas while permitting the latter to escape to atmosphere.

2. A method for the removal of acid gases from a flue gas comprising: dispersing a particulate alkaline reactant and a particulate deliquescent compound in a humid air stream having a partial pressure of water vapor greater than the vapor pressure of the liquefied deliquescent compound or of its highest hydrate maintaining the reactant and deliquescent compound in the humid air stream for a period between 1 and 8 seconds, and thereby dissolving the deliquescent compound by adsorbing water on the alkaline reactant; bringing said humid air and, dispersed therein, so-treated alkaline reactant into uniformly dispersed contact with said flue gas and effecting reaction of contained acid gases with so-treated alkaline reactant thereby removing said acid gases from the flue gas; and removing at least partially spent alkaline reactant from the flue gas while permitting the latter to escape to the atmosphere.

3. A method for the removal of acid gases from flue gas, said method comprising: dispersing, and maintinaing for a period of at least 2 to 6 seconds a finely divided alkaline reactant selected from at least one of a group consisting of the alkali metal and alkaline earth oxides, hydroxides, carbonates and bicarbonates, in humid air having a moisture content greater than a minimum critical moisture content, $H_c$, whereby moisture is adsorbed on the surface of the selected alkaline reactant; dispersing a deliquescent compound in the humid air having a partial pressure of water vapor greater than that of said deliquescent compound and thereby dissolving deliquescent compound; conveying so-treated reactant and so-treated deliquescent compound in a stream of the said humid air into uniformly dispersed contact with said flue gas and effecting reaction of contained acid gases with so-treated alkaline reactant thereby removing said acid gases from the flue gas; and removing solids including at least partially spent alkaline reactant from the flue gas while permitting the latter to escape to the atmosphere.

4. The method of claim 1 in which the humid gas is a mixture of air and steam and the proportion and temperature of the latter is adjusted so that the relative water-vapor tension of the mixture is higher than the fugacity of at least a monomolecular layer of water thereby adsorbed on the reactant.

5. The method of claim 2 in which the said alkaline reagent and deliquescent compound are conveyed in a stream of humid air into contact with the flue gas.

6. The method of claim 3 in which the deliquescent compound is selected from the group consisting of sodium carbonate, sodium bicarbonate, sodium chloride, calcium suflate, magnesium sulfate, magensium carbonate, and sodium sulfate.

7. The method of claim 2 in which the deliquescent compound and the particulate alkaline reagent are used in a ratio by weight, respectively of between 1:50 and 1:5.

8. The method of claim 3 in which the finely divided alkaline reactant is hydrated lime.

9. The method of claim 1 in which the particulate alkaline reactant is selected from the group consisting of alkali metals and alkaline earth metal oxides, hydroxides and carbonates.

* * * * *